United States Patent [19]
GianFrancisco

[11] Patent Number: 5,928,447
[45] Date of Patent: Jul. 27, 1999

[54] CONDUIT REPAIR AND INTERIOR RECONSTRUCTION

[76] Inventor: Thomas GianFrancisco, 316 N. Janes Ave., Bowlingbrook, Ill. 60440

[21] Appl. No.: 08/826,528

[22] Filed: Apr. 3, 1997

[51] Int. Cl.⁶ .............................. F16L 1/00; F16L 55/162
[52] U.S. Cl. ................................. 156/94; 138/97; 138/98; 156/294; 264/36.16; 405/150.1; 405/154
[58] Field of Search ........................ 156/294, 94; 138/97, 138/98; 405/154, 155, 150.1; 264/269, 36.16

[56] References Cited

U.S. PATENT DOCUMENTS

| | | | |
|---|---|---|---|
| 4,585,371 | 4/1986 | Jones-Hinton | 405/150.1 |
| 4,678,370 | 7/1987 | Allen | 405/154 |
| 4,995,929 | 2/1991 | Menzel | 156/294 |
| 5,101,863 | 4/1992 | Fujii | 138/98 |
| 5,102,263 | 4/1992 | Allen | 138/97 |
| 5,190,705 | 3/1993 | Corazza | 364/36 |
| 5,388,929 | 2/1995 | Molyneux | 405/154 |
| 5,580,406 | 12/1996 | O'ffill | 156/294 |

FOREIGN PATENT DOCUMENTS

| | | | |
|---|---|---|---|
| 64-42219 | 2/1989 | Japan | 264/270 |
| 2041147 | 9/1980 | United Kingdom | 138/97 |

*Primary Examiner*—Daniel Stemmer
*Attorney, Agent, or Firm*—Brezina & Ehrlich

[57] ABSTRACT

A method for repair of a length of a conduit having a circumferential inner surface, by anchoring to the inner surface in a direction parallel to the length a plurality of sections of tubing of generally rectangular cross-section spaced around the conduit in the circumferential direction, each of the sections of tubing having therein a plurality of openings in a direction parallel to the circumferential direction. A plurality of strips of plastic sheeting is then anchored to the tubing on a surface opposite to a surface of the tubing anchored to the inner surface, with the strips of plastic sheeting extending circumferentially around the conduit along the length of the repair, and defining a space between the plastic sheeting and the inner surface. A first end of each of the plurality of sections of tubing and adjacent space between the sheeting and the conduit is sealed, and a settable liquid plastic is pumped into a second end of a plurality of sections of tubing, which exits through the openings and fills the space. The settable liquid plastic is permitted to cure, thereby repairing the conduit.

15 Claims, 4 Drawing Sheets

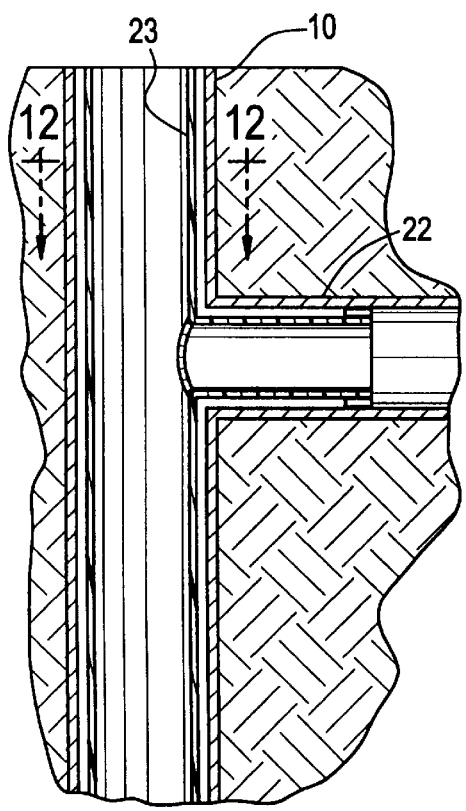
FIG. 11
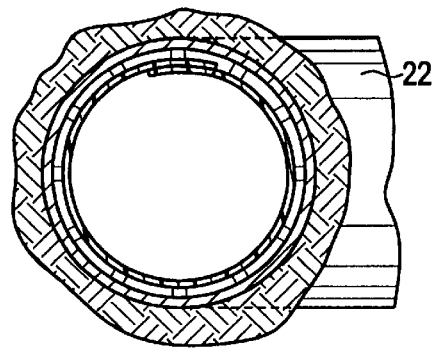
FIG. 12
FIG. 13
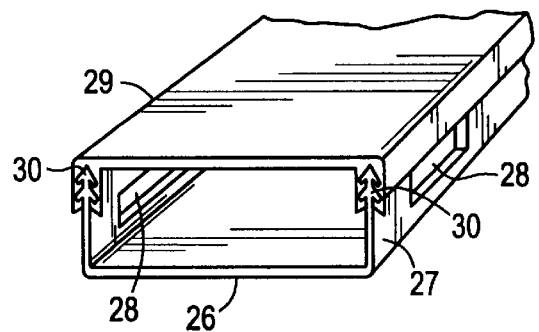
FIG. 14
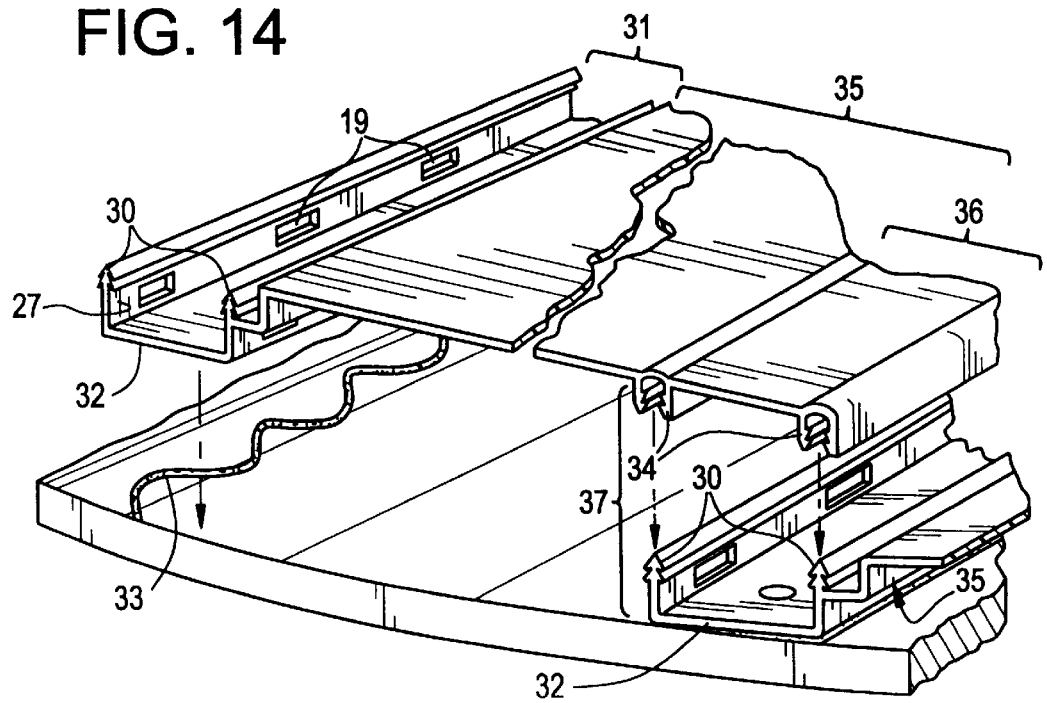

CONDUIT REPAIR AND INTERIOR RECONSTRUCTION

BACKGROUND OF THE INVENTION

1. Field of the Invention

The present invention relates to repair and reconstruction of tunnels, sewers and other structures referred to herein as conduits, which have deteriorated due to age and are in need for reconstruction which includes both waterproofing and strengthening of the internal structure.

2. Description of Related Art

Tunnels and particularly sewer structures in the U.S. and throughout the world are frequently deteriorated to the point where they do not retain the liquids and other effluent they need to contain; often, they do not exclude ground water from entering or lose their structural capability. These normally brick or masonry structures require repairs which necessitate replacement of the masonry structure with a new one. This requires digging up of the old sewer structure, removing the old materials and replacing the brick or concrete sewer line with a new one made of similar materials. All of this involves enormous cost and disruption of pedestrian or vehicular traffic since many sewer lines are buried under streets or sidewalks in cities.

The problem is particularly acute for the larger sewer lines which have to be built up in place, in contrast to smaller sewer lines which can be preformed pipe-like elements laid end-to-end.

There have been various attempts to rebuild these types of sewer lines utilizing plastic liners. One example is U.S. Pat. No. 4,585,371, to Jones-Hinton. This patent shows a sewer liner composed of two types of longitudinal plastic shapes linked edge-to-edge to form an approximately semi-circular tunnel liner open at the bottom. This liner is formed of rib-like elements or spacer elements located between and interlocked with the side members of the relatively wider, flat lining elements which, when in position, form the liner wall of the assembly. When in place, a settable liquid or semi-liquid compound is injected into the longitudinal end openings or hollow portions of lining elements to strengthen and stiffen them. In addition, the settable compound can be injected separately between the inner surface of the sewer to be repaired and the outer surface of liner elements to fill in the space between the various rib-like elements and the tunnel to be repaired. Since the whole liner structure of Jones-Hinton loosely contacts the tunnel liner and the whole assembly is not fastened to and is allowed to move within the tunnel, there is no seal between the settable compound when set and the structure composed of spacer elements and lining elements or with the tunnel wall. Other problems are apparent from the statement in this reference that the lubricants must be introduced to slidably assemble the elements together. This would create extensive problems since these elements, when put in place in the sewer to be repaired, might be many feet long, perhaps 50' to 200' in length, requiring sliding of the elements within each other the whole distance. Other deficiencies are obvious in that the bottom of the whole structure is open, thereby not functioning to retain sewer liquids or exclude ground water, in addition to not having significant structural strength to reinforce the weakened physical structure of the deteriorated sewer.

Another prior effort is illustrated by U.S. Pat. No. 4,366,012. This patent discloses lining a sewer to be repaired with a tube of felt with an impervious plastic outer layer, applying a "slug" of resin to the inner tube of fibrous felt-like material and drawing the tube through squeezing rollers while a vacuum is drawn through one or more openings in advance of the spreading resin. The process involved placing a measured quantity of semi-liquid settable plastic at the end of the tunnel segment to be repaired, spreading the settable plastic through the inner fibrous tube sequentially from the far portion to the near portion by using rollers and drawing air from the fiber tube.

SUMMARY OF THE INVENTION

It is therefore the object of the invention to repair a conduit without the necessity of drawing a vacuum, and without the disadvantages of the various prior art methods.

To achieve this and other objects, the invention provides a method for repair of a length of a conduit having a circumferential inner surface, comprising the steps of:

a) anchoring to the inner surface in a direction parallel to the length a plurality of sections of tubing of generally rectangular cross-section spaced around the conduit in the circumferential direction, each of the sections of tubing having therein a plurality of openings in a direction parallel to the circumferential direction;

b) anchoring to the tubing on a surface thereof opposite to a surface of the tubing anchored to the inner surface a plurality of strips of plastic sheeting, the strips of plastic sheeting extending circumferentially around the conduit along the length of the repair, defining thereby a space between the plastic sheeting and the inner surface, the plastic sheeting being primed on a surface thereof facing the inner surface of the conduit;

c) sealing a first end of each of the plurality of sections of tubing, and the adjacent space between the sheeting and the conduit;

d) pumping into a second end of a plurality of sections of the tubing a settable liquid plastic, which exits through the openings and fills the space; and e) permitting said epoxy grout to cure, thereby repairing the conduit.

The first of the components used in the repair is PVC tubing of generally rectangular cross-section which is slotted or perforated throughout its length. The tubing is generally 1–1.5 inches square or rectangular with slots or perforations extending its length, which is normally about 300 feet.

The second component is PVC sheeting, about 2 feet wide, up to 300 feet long and ⅛ inch thick.

The third component is a settable liquid plastic, generally an epoxy grout. This settable liquid plastic is generally part of a system including a primer. In a preferred embodiment, the primer combines an isocyanate functional material with a co-reactant polymer capable of reaction with the isocyanate.

The isocyanate may be aliphatic or aromatic in nature and may be a monomer, a trimer, a biuret or prepolymer. The co-reactant polymer may be a hydroxyl, amine or mercaptan terminated polyester, polyether, acrylic or vinyl polymer.

Since the isocyanate and the co-reactant polymer are selected to react with each other, they must be supplied in separate packages, and combined just prior to use.

The settable liquid plastic is preferably an epoxy grout, which is a combination of liquid epoxy resin, mineral filler and amine curing agent for the epoxy resin. The epoxy resin may be of the Bisphenol A, Bisphenol F or cycloaliphatic type.

Preferred mineral fillers are ground silica, calcium carbonate, mica and talc, although other materials such as glass fibers, flakes or spheres may be used. The amine hardener may be aliphatic, cycloaliphatic or aromatic in nature; amides, amidoamines and adducts of aliphatic, cycloaliphatic and aromatic amines may also be used.

The epoxy grout must be supplied with the amine hardener separate from the resin, with mixing just prior to use. The filler may be provided combined with the resin, or may be in a separate package.

Initially, the sewer or wastewater conduit to be repaired is cleaned using a power wash of 1200–3000 PSI water with or without sandblasting for the purpose of removing material to expose a clean and solid surface. Next, the surface is etched using muriatic or similar acid, followed by flushing with a solution having a chlorine content to kill bacteria.

The tubing and PVC sheeting affixed along the conduit to be repaired is preferably supplied in up to about 300 foot lengths at a time. The strips of sheeting are coiled up smaller than the opening from the surface to the portion to be fixed and rolled out when inside the conduit. The rectangular tubing is applied longitudinally to the sewer at 2 foot intervals around the circumference with concrete screws or anchors. The strips of PVC sheeting are then glued or welded to the tubing using plastic welding techniques. It is important that the surface of the strips which face the inner surface of the conduit be primed for adhesion, typically with a primer compatible with the settable liquid plastic; other priming methods known to those of ordinary skill in the art may also be used. The surface of the tubing is also preferably primed.

The conduit having a plastic sheet liner assembly fixed therein is prepared for application of the epoxy grout by sealing one end of each of the tubing sections anchored to the conduit, as well as the adjacent spaces between the conduit and sheeting, with foam epoxy putty. At the opposite end of the tubing sections, a fitting is inserted to adapt the rectangular tubing for connection with a round hose. The outer round portion of the rectangular-to-round fitting is sized to fit flexible hose which will extend outwardly to a hose outlet on a manifold. The manifold includes a central chamber for receiving the epoxy grout from a pump and multiple tubing fittings adapted to receive the opposite ends of the hoses which have been attached to the rectangular-to-round fittings. The manifold preferably includes one or two outlet tubes to accommodate sequentially all of the longitudinal rectangular tubing sections anchored to the conduit to be repaired and holding the PVC liner in place.

The epoxy grout is then pumped through the manifold and through the sections of rectangular tubing mounted on the wall of the conduit to be repaired. At the introduction end of the conduit, one tubing section, preferably at the high point of the system, is not used for introduction of epoxy grout, but is attached to a hose which in turn leads to a bucket or like receptacle located a short distance away. When the epoxy grout material starts coming out of this outlet tube, the operator knows that the space between the PVC liner and the sewer line to be repaired has been filled with grout and the pumping can be stopped.

A heat exchanger, for example a heating element or fluid-carrying, heat exchanging tubing can be introduced in the assembly at any point in the path of the incoming grout. Such heat exchanger can be used if desired to increase the temperature of the grout in order to decrease the curing time of the epoxy. Similarly, if the epoxy temperature is such as to cause excessively rapid curing of the epoxy, the heat exchanger will cool the grout and thus slow up curing downstream in the area to be repaired.

Laterals or lines extending to or outward from a main conduit to be repaired are lined by cutting an opening in the main conduit wall slightly smaller than the size of the lateral conduit, and rolling a piece of PVC sheeting into a cylindrical shape extending about 10–15 inches into the lateral pipe. The seam between the opening in the large pipe and small pipe is held in place and sealed by application of an adhesive or through use of plastic welding techniques. The sleeve portion that extends into the liner is trimmed even with the inner wall of the liner.

BRIEF DESCRIPTION OF THE DRAWINGS

The invention will be better understood with reference to the following drawing figures, in which:

FIGS. 11 and 12 depict a modified structure for extending the sewer liner to "laterals" or smaller sewer conduits through which sewage enters the main sewer, with FIG. 11 in longitudinal cross-section and FIG. 12 in lateral cross-section.

FIG. 13 illustrates an alternate form of the rectangular tubing/connecting plastic sheet assembly where a single piece of extruded plastic can be snapped together to form the aforementioned assembly with the base portions which form the rectangular tubing fastened to the inner surface of the sewer;

FIG. 14 depicts an alternate form of rectangular tube construction having a bottom channel with a snap on top;

DESCRIPTION OF THE PREFERRED EMBODIMENTS

Figure 1:
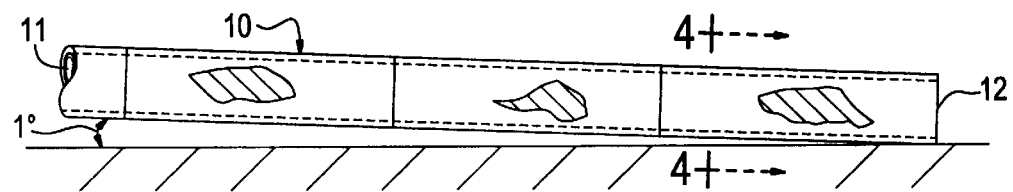
FIG. 1 shows a side elevational view of a length of sewer line under repair illustrating, in somewhat exaggerated form, the disposition of a normal sewer at a very slight angle to the horizontal.

FIG. 1 shows a section of sewer line 10 to be repaired, having an upper end 11 and a lower end 12. The repair commences from the upper end 11 to facilitate the latter stages of the process when the settable liquid is introduced so that gravity causes the lower end 12 to fill up first beginning at the bottom portion, extending around the sides and gradually filling the system from the bottom of lower end 12 to the top of the upper end 11, the repair structure then being filled with settable liquid plastic. The processing steps of the invention are applied sequentially to selected lengths of sewer line or tunnel ranging usually from 50 to 300 feet.

Figure 2:
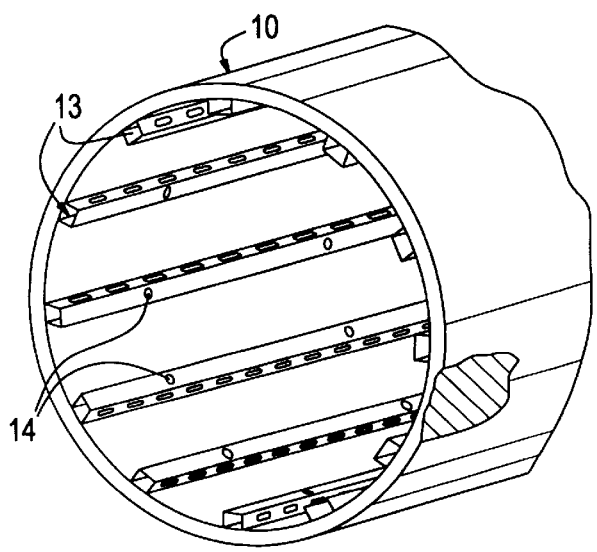
FIG. 2 shows a perspective view of the end of the sewer after the inner surface is cleaned and prepared, with the longitudinal, perforated rectangular tubing fastened in place.
Figure 6:
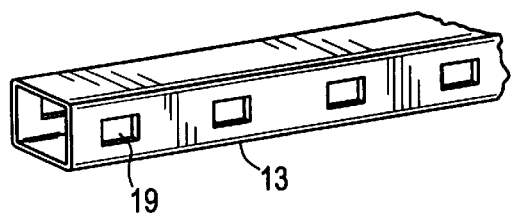
FIGS. 6 and 7 are perspective views depicting the configuration of the rectangular tubing shown in the above Figures.
Figure 7:
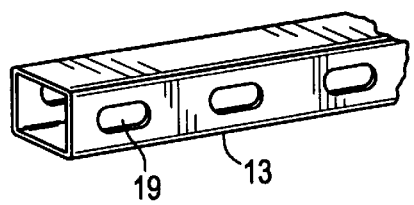

FIG. 2 shows the first step in the mechanical application which follows cleaning of the inside of the sewer line, as set forth above. Rectangular tubing sections 13, also shown in FIGS. 6 and 7, are mounted longitudinally inside the sewer 10 utilizing metal anchors or fasteners 14. Once the longitudinally mounted rectangular tubes are in place a preselected distance apart circumferentially, such as 2 feet apart, and parallel to each other, strips of primed plastic sheeting of various lengths, and whose length may equal the length of the sewer segment being lined, are fixed with their edges abutting one another against the rectangular tubes by means of a plastic adhesive, welding or the like.

Figure 3:
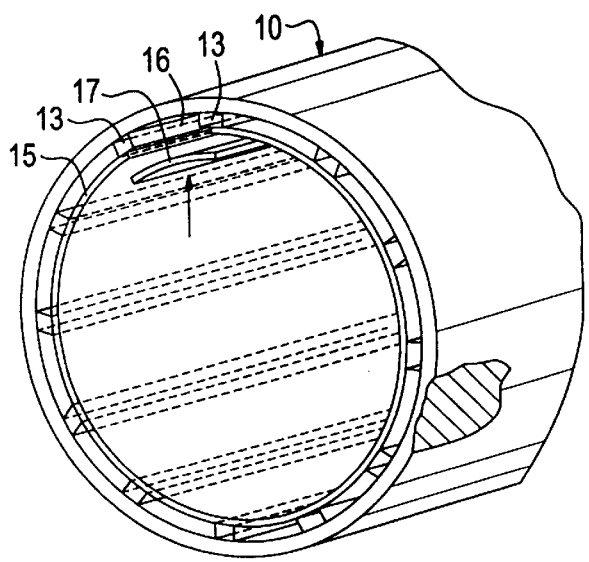
FIG. 3 shows the view of FIG. 2 with the longitudinal strips of plastic sheeting having their adjacent edge portions anchored to the tubing by adhesive or a plastic welding process.

FIG. 3 illustrates the plastic sheeting 15 in the form of strips forming a lining of the sewer mounted on the rectangular tubing 13. These strips, as well as the rectangular tubing, are covered with a primer, the plastic strips being coated on the side toward the sewer.

FIG. 3 shows the uppermost plastic liner strip 15 without the last and uppermost strip being in place. This is done to accommodate variances between the inside circumference of the tunnel and the aggregate widths of all of the plastic strips. Since it is common not to end up with the preset widths of strips 15 mounted on rectangular tubes 13 to exactly fill the aggregate spaces between all rectangular tubes 13, the opening between the uppermost rectangular tubes is initially left open, shown as gap 16. In this event, the gap 16 is covered by application of a last or filler strip 17 which is applied to the outside of the plastic lining formed on either side of the gap 16. Alternatively, this last plastic strip to fill gap 16 can be trimmed to a narrower width and adhered directly to rectangular tubes 13 on either side of the gap 16 in the sheet liner 15.

Figure 4:
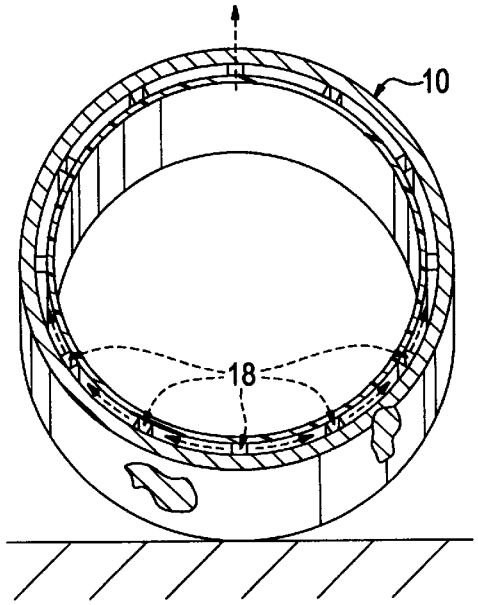
FIG. 4 is a lateral cross sectional view of the sewer of FIG. 1, showing by arrows where the liquid settable plastic is to be injected initially, with FIG. 5 showing where the liquid plastic is injected after completing the injection and filling of the tubing and adjacent spaces between the tubes from the positions shown in FIG. 4.

FIG. 4 shows a cross-section of the sewer with the plastic inner liner in place and shows by indicated arrows 18 the rectangular tubes 13 through which the settable liquid plastic epoxy grout is introduced initially. The liquid plastic passes through the rectangular tubing from left to right from opening 11 to the end 12 shown in FIG. 1, and, at the same time, passes through openings 19 in the sides of rectangular tubing 13 as shown in FIGS. 6 and 7, and fills the space between the inner surface of the sewer line and the plastic sheeting 15. The operator may sequentially insert the settable liquid plastic as shown at points 18 through use of manifold 23 illustrated in FIG. 9 to accommodate the initial filling of the space between the sewer and the plastic liner.

Before the settable liquid is introduced in the segment to be repaired, the end of the space between the plastic liner 15 and the inner portion of the sewer 10, including the ends of all but one of the rectangular tubes, is filled with a plastic foam putty or like sealing element at the end 20 of the sewer segment being worked on. One of the rectangular tubes, preferably the tube at the high point of the system, preferably remains open, and is connected to an exhaust tube 24 which indicated completion of the filling process.

Figure 5:
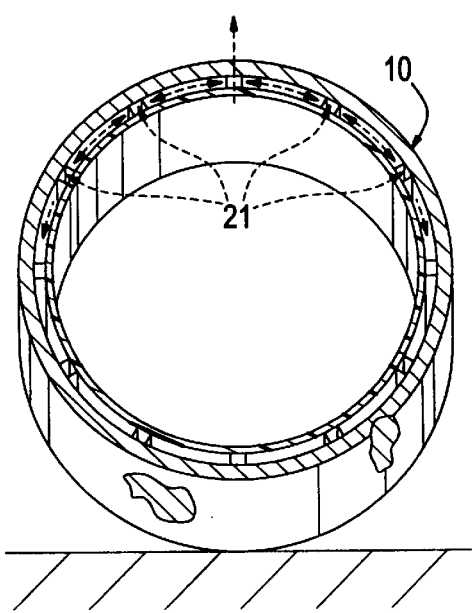
Figure 8:
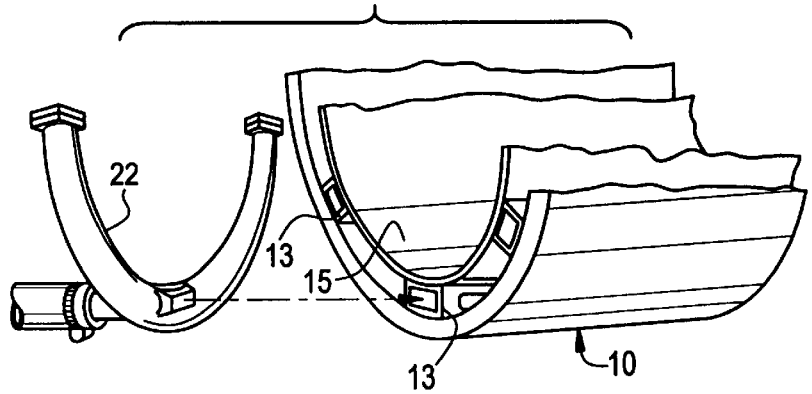
FIGS. 8 and 9 show a manifold system used to distribute liquid plastic, including a flexible hose conducting settable liquid plastic from a pump through a manifold having rectangular fittings adapted to fit tightly inside the outer ends of the rectangular tubing to, in turn, fill the rectangular tubing and the adjacent spaces between the tubing sections, the plastic sheeting and the inner walls of the sewer to be lined.
Figure 9:
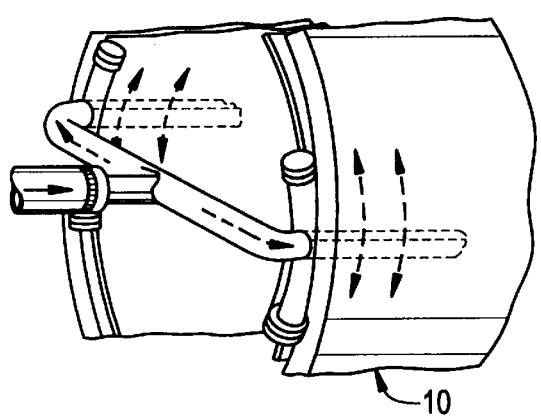

FIG. 5 shows by arrows 21 the rectangular tubes through which the settable liquid is finally inserted toward the top through use of manifold 22 shown in FIG. 8, or the alternative manifold 22a shown in FIG. 9.

Figure 10:
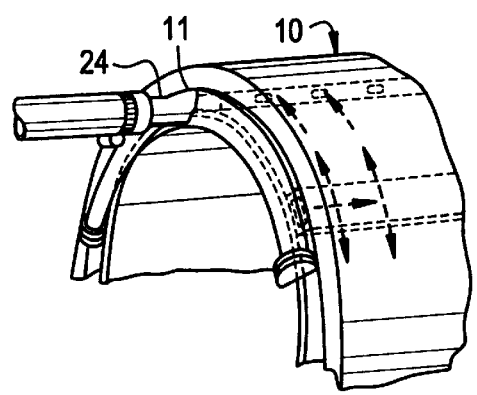
FIG. 10 illustrates an outlet hose system located at the upper portion of the segment of the assembly depicted in the above Figures where the liquid plastic is introduced through the lower end portions.

FIG. 10 shows a settable liquid exhaust tube 23 located at the top of the input end 11 of the sewer to be repaired. The purpose of this tube is to show when the whole segment of the sewer to be repaired, with rectangular tubes and plastic sheeting in place, has been filled up with settable plastic grout. Thus, the settable grout introduced into the lower part of the sewer to be repaired passes down the tube toward the end 12, being blocked by the plugs 20, fills the lower portions and the ends of the hollow portion near the end 12 and works backward up the upper portion of the area between the plastic liner and the inside of the sewer until it reaches the exhaust tube 24. When exhaust tube 24 passes out 2 to 3 gallons of settable liquid grout, it indicates to the operator that the whole system between the plastic liner and the inner wall of the sewer is filled and the air and water have been removed.

FIGS. 11 and 12 show in cross-section, elements of the sewer 10 to be repaired and show the connection of the liner system of the invention with "laterals," smaller sewer conduits 24 through which sewer effluent enters the main sewer 10. This connection can be made by rolling a sheet of plastic to form a tube or using a tube itself 24a, cutting a hole 10a to accommodate the formed tube in the side of the main sewer 10, sealing the tubular element to the main sewer 10 by plastic welding techniques or adhesive and trimming off the excess portions of the small tube extending into the main sewer. The opening between the formed tube 24a and the lateral 24 at the outside end of the lateral must be filled with plastic foam sealant or the like 25. This prevents the settable plastic from passing out of the repair area and permits use of the sewer before the liquid plastic grout has set.

FIG. 13 shows an alternate form of rectangular tubing structure including a channel base element having a bottom segment 26 and an upstanding sidewall 27. This channel shaped segment can be fastened to the cleaned surface of the inside of the sewer line using anchors in a manner similar to fastening rectangular tubes 13 as shown in FIG. 2. The sides of the channel have openings 28 similar to the openings 19 in FIGS. 6 and 7 to allow flowing of settable plastic grout. The channel 26 is converted to a rectangular tube by adding a cover 29 which is affixed to the channel by means of snap-on fittings 30.

This structure functions similarly to rectangular tubing 13 by allowing the settable plastic grout under pressure to spread out through the openings 28 which are openings defined by the inner wall of the sewer, the plastic sheet to which the now rectangular tube 24 is fastened and the adjacent parallel tube of the same description.

FIG. 14 is a second alternative unitary system combining the functions of the rectangular tubes and the plastic sheeting connecting them. It consists of a channel-like segment 31 having a base 32 which is fastened to the inside of the sewer to be repaired by adhesive 33 or a metal fastener 14. The sidewalls 27 of the channel portion 31 have mating snap-on fittings 30 and 34 which when snapped together form a rectangular tube which can function similarly to the device shown in FIG. 13, tubes 13 in FIG. 2 and openings 19 in FIGS. 6 and 7. The center section of the integral tube and plastic sheeting assembly is a plastic sheeting element 35 which connects the cap-forming edge of the assembly 36 with the rectangular tube base assembly forming element 37.

These unitary rectangular tube and plastic sheet forming assemblies can be inserted in the sewer to be repaired, the bases fastened to the inner surface of the sewer by anchors or screws similar to those used to anchor the rectangular tubes in FIGS. 2–5, and successively snapped together edge to edge to line the sewer line with settable plastic receiving chambers.

As indicated above, where the width of these integral rectangular tube forming/plastic sheet assemblies do not closely match the circumference of the inner surface of the sewer to be repaired, these assemblies should be put in place with an opening left at the top which can be closed by covering with a strip of plastic sheeting wide enough to cover the opening and which is held in place by an adhesive or plastic welding. Alternatively, the opening can be covered with a piece of the assembly shown in FIG. 14 slit lengthwise down the middle with the mid-portions of the plastic sheeting portions overlapping and fastened together by use of adhesive or plastic welding techniques.

Figure 15:
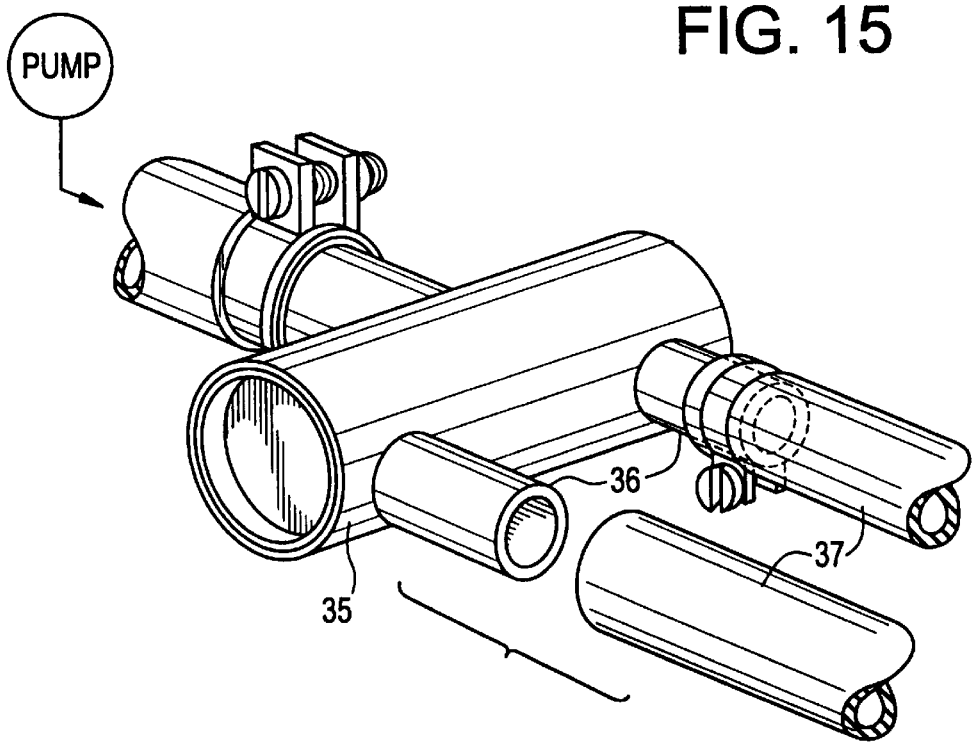
FIG. 15 is a perspective view of an assembly for filling the sewer with settable liquid plastic grout.

FIG. 15 shows the assembly for filling the plastic lined sewer described in the above mentioned figures. The settable plastic grout is driven by a pump, schematically shown, to a manifold 37 having two outlet tubes 38 successively held from the bottom to the top of the rectangular tubes in the above-mentioned plastic liner assembly. Each outlet tube 38 is connected by a flexible tube 39 to one of the rectangular tubes in the aforementioned plastic liner assembly by a rectangular-to-round fitting.

Figure 16:
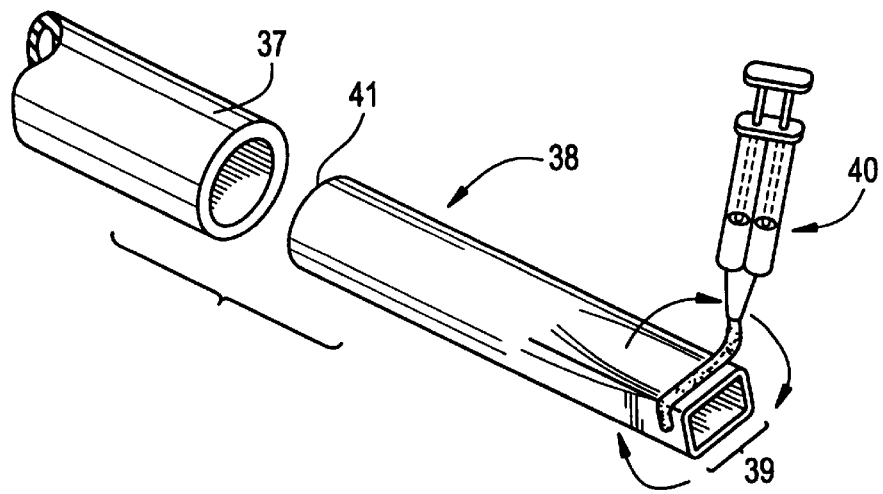
FIG. 16 is a perspective view of a rectangular-to-round fitting.

FIG. 16 illustrates a rectangular-to-round fitting 40. The rectangular portion 41 fits inside rectangular tubes 13 or the other forms of rectangular tubes shown in FIGS. 6, 7, 13 and 14. An epoxy sealant 42 secures the rectangular portion 41 inside the rectangular tube to prevent it from being forced out when the system is under pressure. The round portion 43 of rectangular-to-round fitting 40 fits inside a flexible tube 39 whose other end is affixed to a manifold tube.

Alternatively, a round hose may have one end flattened to fit in a rectangular tube end. The flattened end is glued into the tube end with epoxy putty.

A heat exchanger (not shown) may be placed in the settable plastic feed line between the pump and the manifold to raise or lower the temperature of the liquid settable plastic grout. The purpose of such a unit is to vary the cure rate of the settable plastic which is usually affected by the temperature of the plastic when it is in place.

Normally, the liquid settable plastic has as high a percentage of solids. The preferred type of plastic described herein has the consistency of pea soup and can be readily pumped through the system described, reaching the points throughout the system it needs to reach. When cured, it forms a dense solid bonding strongly to its internal plastic structure and conforming to the inner wall of the sewer to be repaired. Such a unitary structure has superior strength and sealing ability, to keep sewer effluent inside the conduit and ground water and other infiltration outside.

What is claimed is:

1. A method for repairing a length of a conduit having a circumferential inner surface, comprising the steps of:
    a) anchoring to the inner surface in a direction parallel to the length a plurality of sections of tubing of generally rectangular cross-section spaced around the conduit in the circumferential direction, each of said sections of tubing having therein a plurality of openings in a direction parallel to the circumferential direction;
    b) anchoring to the tubing on a surface thereof opposite to a surface of the tubing anchored to the inner surface a plurality of strips of plastic sheeting, said strips of plastic sheeting extending circumferentially around the conduit along the length of the repair, defining thereby a space between the plastic sheeting and the inner surface, said plastic sheeting being primed on a surface thereof facing the inner surface of the conduit,
    said anchoring of strips starting adjacent bottom and side portions of the inner surface and concluding by cutting a final strip of sheeting to a remaining width and anchoring adjacent a top portion of the inner surface;
    c) sealing a first end of each of the plurality of sections of tubing and adjacent space between the sheeting and the conduit;
    d) pumping into a second end of a plurality of sections of tubing a settable liquid plastic, which exits through said openings and fills said space; and
    e) curing said settable liquid plastic, thereby repairing said conduit.

2. A method according to claim 1, wherein the settable liquid plastic comprises an epoxy grout.

3. A method according to claim 1, additionally comprising cleaning the inner surface prior to said anchoring to the inner surface.

4. A method according to claim 3, wherein the inner surface is cleaned by exposing to high pressure water.

5. A method according to claim 1, wherein said anchoring to the tubing is performed with adhesive or by welding.

6. A method according to claim 1, wherein one of the plurality of sections of tubing, disposed adjacent a top portion of the inner surface, is connected at said second end to an open container,
    the method additionally comprising terminating said pumping after said settable liquid plastic exits into said container, indicating completion of filling of said space.

7. A method according to claim 1, wherein the conduit comprises an additional conduit perpendicular to the conduit,
    the method additionally comprising forming a tube from plastic material, cutting a hole in the strips of plastic sheeting adjacent the additional conduit, inserting the tube through the hole into the additional conduit, cutting off any excess plastic material extending into the conduit and sealing the plastic material to the strips of plastic sheeting.

8. A method according to claim 1, wherein each of said strips of plastic sheeting is formed in a unitary manner with a portion of at least one of said sections of tubing, and said step of anchoring to the tubing completes formation of the tubing.

9. A method for repairing a length of a conduit having a circumferential inner surface, comprising the steps of:
    a) anchoring to the inner surface in a direction parallel to the length a plurality of sections of tubing of generally rectangular cross-section spaced around the conduit in the circumferential direction, each of said sections of tubing having therein a plurality of openings in a direction parallel to the circumferential direction;
    b) anchoring to the tubing on a surface thereof opposite to a surface of the tubing anchored to the inner surface a plurality of strips of plastic sheeting, said strips of plastic sheeting extending circumferentially around the conduit along the length of the repair, defining thereby a space between the plastic sheeting and the inner surface, said plastic sheeting being primed on a surface thereof facing the inner surface of the conduit;
    c) sealing a first end of each of the plurality of sections of tubing and adjacent space between the sheeting and the conduit;
    d) pumping into a second end of a plurality of sections of tubing a settable liquid plastic, which exits through said openings and fills said space; and e) curing said settable liquid plastic, thereby repairing said conduit, wherein each of said strips of plastic sheeting is formed in a unitary manner with a portion of at least one of said sections of tubing, and said step of anchoring to the tubing completes formation of the tubing.

10. A method according to claim 9, wherein the settable liquid plastic comprises an epoxy grout.

11. A method according to claim 9, additionally comprising cleaning the inner surface prior to said anchoring to the inner surface.

12. A method according to claim 11, wherein the inner surface is cleaned by exposing to high pressure water.

13. A method according to claim 9, wherein said anchoring to the tubing is performed with adhesive or by welding.

14. A method according to claim 9, wherein one of the plurality of sections of tubing, disposed adjacent a top portion of the inner surface, is connected at said second end to an open container, the method additionally comprising terminating said pumping after said settable liquid plastic exits into said container, indicating completion of filling of said space.

15. A method according to claim 9, wherein the conduit comprises an additional conduit perpendicular to the conduit, the method additionally comprising forming a tube from plastic material, cutting a hole in the strips of plastic sheeting adjacent the additional conduit, inserting the tube through the hole into the additional conduit, cutting off any excess plastic material extending into the conduit and sealing the plastic material to the strips of plastic sheeting.

* * * * *